(12) United States Patent
Schock (10) Patent No.: US 11,939,905 B2
(45) Date of Patent: Mar. 26, 2024

(54) INTERNAL COMBUSTION ENGINE INCLUDING MULTIPLE FUEL INJECTIONS EXTERNAL TO A PRE-CHAMBER

(71) Applicant: Board of Trustees of Michigan State University, East Lansing, MI (US)

(72) Inventor: Harold Schock, Brighton, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 26 days.

(21) Appl. No.: 17/322,999

(22) Filed: May 18, 2021

(65) Prior Publication Data

US 2021/0363913 A1    Nov. 25, 2021

Related U.S. Application Data

(60) Provisional application No. 63/027,371, filed on May 20, 2020.

(51) Int. Cl.
*F02B 19/12* (2006.01)
*F02B 19/18* (2006.01)
*F02M 61/14* (2006.01)

(52) U.S. Cl.
CPC .............. *F02B 19/12* (2013.01); *F02B 19/18* (2013.01); *F02M 61/14* (2013.01)

(58) Field of Classification Search
CPC .......... F02B 19/12; F02B 19/18; F02B 19/10; F02M 61/14; F02D 41/009; F02D 2041/0015; F02D 41/0002; F02D 41/402
See application file for complete search history.

(56) References Cited

U.S. PATENT DOCUMENTS

| | | |
|---|---|---|
| 2,050,392 A | 8/1936 | Starr |
| 3,508,530 A | 4/1970 | Clawson |
| 3,805,747 A | 4/1974 | Nakagawa et al. |
| 3,924,592 A | 12/1975 | Miyaki et al. |
| 3,957,021 A | 5/1976 | Loyd, Jr. |
| 4,060,058 A | 11/1977 | Hideg et al. |

(Continued)

FOREIGN PATENT DOCUMENTS

| | | |
|---|---|---|
| CN | 102333944 A | 1/2012 |
| CN | 106014694 A | 10/2016 |

(Continued)

OTHER PUBLICATIONS

Gussak, L.A., et al.; "The Application of Lag-Process in Prechamber Engines," SAE Paper 790692, Society of Automotive Engineers, 1980, pp. 2355-2380.

(Continued)

*Primary Examiner* — Xiao En Mo
(74) *Attorney, Agent, or Firm* — Harness, Dickey & Pierce, PLC (57) ABSTRACT

An internal combustion engine includes multiple fuel injections external to a pre-chamber. A further aspect provides an engine pre-chamber ignition apparatus which employs a pre-assembled and/or removable cartridge including an ignitor and a fresh air inlet but not a fuel inlet injector directly mounted thereto. Another aspect of a vehicular engine apparatus includes a fuel injector positioned externally to a pre-chamber which delivers an initial greater quantity of fuel for combustion and then a later and smaller quantity of fuel for pre-chamber ignition.

27 Claims, 7 Drawing Sheets

(56) References Cited

U.S. PATENT DOCUMENTS

| | | |
|---|---|---|
| 4,259,932 A | 4/1981 | Hideg et al. |
| 4,300,497 A | 11/1981 | Webber |
| 4,332,224 A | 6/1982 | Latsch et al. |
| 4,429,669 A | 2/1984 | Burley |
| 4,592,318 A | 6/1986 | Pouring |
| 5,036,669 A | 8/1991 | Earleson et al. |
| 5,081,969 A | 1/1992 | Long, III |
| 5,454,356 A | 10/1995 | Kawamura |
| 5,520,864 A | 5/1996 | Frei |
| 5,560,326 A | 10/1996 | Merritt |
| 6,535,116 B1 | 3/2003 | Zhou |
| 6,694,944 B2 | 2/2004 | Agama et al. |
| 6,854,439 B2 | 2/2005 | Regueiro |
| 6,953,020 B2 | 10/2005 | Kojic et al. |
| 7,000,596 B2 | 2/2006 | Zurloye et al. |
| 7,100,567 B1 | 9/2006 | Bailey et al. |
| 7,107,964 B2 | 9/2006 | Kojic et al. |
| 7,398,743 B2 | 7/2008 | Fiveland |
| 7,584,739 B2 | 9/2009 | Takahashi et al. |
| 8,062,976 B2 | 11/2011 | Vecchione et al. |
| 8,857,405 B2 | 10/2014 | Attard |
| 8,910,612 B2 | 12/2014 | Woo et al. |
| 8,925,518 B1 | 1/2015 | Riley et al. |
| 9,091,222 B2 | 7/2015 | Furukawa |
| 9,305,901 B2 | 4/2016 | Dropps |
| 9,376,955 B2 | 6/2016 | Reitz et al. |
| 9,508,667 B2 | 11/2016 | Prack |
| 9,653,886 B2 | 5/2017 | Chiera et al. |
| 9,677,459 B2* | 6/2017 | McClendon ........ F02B 19/1014 |
| 9,799,617 B1 | 10/2017 | Curiel et al. |
| 9,840,963 B2 | 12/2017 | Chiera et al. |
| 9,856,848 B2 | 1/2018 | Chiera et al. |
| 9,890,689 B2 | 2/2018 | Hampson et al. |
| 9,893,497 B2 | 2/2018 | Chiera et al. |
| 9,920,714 B2 | 3/2018 | Ginter et al. |
| 10,054,102 B2 | 8/2018 | Chiera et al. |
| 10,161,296 B2 | 12/2018 | Schock et al. |
| 10,202,891 B2* | 2/2019 | Oda ........................ F02D 19/02 |
| 10,208,651 B2 | 2/2019 | Tozzi et al. |
| 10,287,969 B2 | 5/2019 | Boyde et al. |
| 10,337,397 B2 | 7/2019 | Shelby et al. |
| 11,466,608 B2* | 10/2022 | Manfredi ................ F02B 19/18 |
| 2005/0092181 A1 | 5/2005 | Shih et al. |
| 2007/0151540 A1* | 7/2007 | Takahashi ............... F02B 19/12 |
| | | 123/275 |
| 2008/0047511 A1 | 2/2008 | Taye et al. |
| 2009/0132153 A1 | 5/2009 | Shutty et al. |
| 2010/0140811 A1 | 6/2010 | Leal et al. |
| 2011/0308495 A1 | 12/2011 | Furukawa |
| 2011/0315102 A1 | 12/2011 | David et al. |
| 2012/0103302 A1 | 5/2012 | Attard |
| 2012/0118262 A1 | 5/2012 | Johnson |
| 2012/0160217 A1 | 6/2012 | Ashizawa |
| 2012/0161317 A1 | 6/2012 | Rathburn |
| 2013/0233273 A1 | 9/2013 | Redtenbacher et al. |
| 2014/0144406 A1 | 5/2014 | Schock et al. |
| 2014/0261298 A1* | 9/2014 | Sasidharan ............. F02B 19/12 |
| | | 123/286 |
| 2015/0059456 A1 | 3/2015 | Niessner et al. |
| 2015/0233280 A1 | 8/2015 | Ernst et al. |
| 2016/0024994 A1 | 1/2016 | Engineer |
| 2016/0160741 A1 | 6/2016 | Gu et al. |
| 2016/0230645 A1 | 8/2016 | Schock et al. |
| 2017/0122184 A1* | 5/2017 | Hampson .............. F02D 41/402 |
| 2017/0191406 A1 | 7/2017 | Rabhi |
| 2017/0251713 A1 | 9/2017 | Warner et al. |
| 2018/0266307 A1* | 9/2018 | Muto ...................... F02B 19/08 |
| 2020/0149498 A1 | 5/2020 | Loetz |
| 2020/0200068 A1 | 6/2020 | Schock et al. |
| 2021/0189946 A1 | 6/2021 | Schock et al. |
| 2021/0207523 A1* | 7/2021 | Guisasola ........... F02B 19/1023 |
| 2021/0355860 A1* | 11/2021 | Lejon .................... F02B 19/108 |

FOREIGN PATENT DOCUMENTS

| | | |
|---|---|---|
| CN | 110318900 A | 10/2019 |
| DE | 10-2005039713 A1 | 2/2007 |
| FR | 2893673 A1 | 5/2007 |
| JP | 2002266644 A | 9/2002 |
| WO | WO-2015/138987 A1 | 9/2015 |
| WO | WO-2019/027800 A2 | 2/2019 |

OTHER PUBLICATIONS

Dainton, L.; "Nikolai Nikolaevich Semenov. Apr. 16, 1896-Sep. 25, 1986," Biographical Memoirs of Fellows of the Royal Society, vol. 36, Dec. 1, 1990, pp. 527-543.

Oppenheim, A. K.; "Prospects for Combustion in Piston Engines," SAE 2002-01-0999, Society of Automotive Engineers, Mar. 4-7, 2002, 17 pages.

Toulson, Elisa; Thesis: "Applying Alternative Fuels in Place of Hydrogen to the Jet Ignition Process," The Department of Mechanical Engineering, The University of Melbourne, 2008, 402 pages.

Toulson, Elisa, et al.; "Gas Assisted Jet Ignition of Ultra-Lean LPG in a Spark Engine," SAE 2009-01-0506, SAE International, 2009, 21 pages.

Toulson, Elisa, et al.; "Modeling Alternative Prechamber Fuels in Jet Assisted Ignition of Gasoline and LPG," SAE 2009-01-0721, SAE International, 2009, 19 pages.

Attard, William P., et al.; "A Turbulent Jet Ignition Pre-Chamber Combustion System for Large Fuel Economy Improvements in a Modern Vehicle Powertrain," SAE 2010-01-1457, SAE Int. J. Engines, vol. 3, Issue 2, May 5, 2010, pp. 20-37.

Ma, Jia, et al.; "Adaptive Control of a Pneumatic Valve Actuator for an Internal Combustion Engine," IEEE Transactions on Control Systems Technology, 2010, 14 pages.

Attard, William P., et al.; "Flame Kernel Development for a Spark Initiated Pre-Chamber Combustion System Capable of High Load, High Efficiency and Near Zero NOx Emissions," SAE 2010-01-2260, SAE Int. J. Engines, vol. 3, Issue 2, Oct. 25, 2010, pp. 408-427.

Toulson, Elisa, et al.; "A Review of Pre-Chamber Initiated Jet Ignition Combustion Systems," SAE 2010-01-2263, SAE International, Oct. 25, 2010, 24 pages.

Mahle, "Turbulent Jet Ignition pre-chamber initiated combustion system supports high efficiency and near-zero engine-out NOx in naturally aspirated PFI engine," Green Car Congress, http://www.greencarcongress.com/2010/10/tji-20101027.html, published Oct. 27, 2010, 5 pages.

Attard, William P., et al.; "A New Combustion System Achieving High Drive Cycle Fuel Economy Improvements in a Modern Vehicle Powertrain," SAE 2011-01-0664, SAE International, Apr. 12, 2011, 23 pages.

Ma, Jia, et al.; "Adaptive Control of a Pneumatic Valve Actuator for an Internal Combustion Engine," IEEE Transactions of Control Systems Technology, vol. 19, No. 4, Jul. 2011, pp. 730-743.

Attard, William P.; "A Single Fuel Pre-Chamber Jet Ignition Powertrain Achieving High Load, High Efficiency and Near Zero NOx Emissions," JSAE 20119100, SAE 2011-01-2023, SAE International, 2011, pp. 734-746.

Attard, William P., et al.; "Spark Ignition and Pre-Chamber Turbulent Jet Ignition Combustion Visualization," SAE 2012-01-0823, SAE International, Apr. 16, 2012, 16 Pages.

Attard, William P., et al.; "A Lean Burn Gasoline Fueled Pre-Chamber Jet Ignition Combustion System Achieving High Efficiency and Low NOx at Part Load," SAE 2012-01-1146, SAE International, Apr. 16, 2012, 14 pages.

Toulson, Elisa, et al.; "Visualization of Propane and Natural Gas Spark Ignition and Turbulent Jet Ignition Combustion," SAE 2012-32-0002, SAE Int. J. Engines, vol. 5, Issue 4, Dec. 2012, 15 pages.

Schock, H., "Option #1: Air Injector and Fuel Injector Used," DOE presentation in Feb. 2015.

"Delphi Variable Cam Phaser," Powertrain Systems, Delphi, Published Jul. 26, 2017, pp. 1-3.

(56) References Cited

OTHER PUBLICATIONS

"Exhaust Gas Recirculation," Wikipedia, https://en.wikipedia.org/wiki/Exhaust_gas_recirculation, printed Jul. 26, 2017, four pages.
Toulson, Elisa, et al.: "Advanced Combustion Engines / 2015 Annual Report," Vehicle Technologies Office, Michigan State University, U.S. Department of Energy, 2015, pp. 162-166.
Gunther, M. et al., "Ignition Systems for Gasoline Engines," IAV Automotive Engineering, $4^{th}$ International Conference, Dec. 6-7, 2018, Germany.

* cited by examiner

FIG - 11

INTERNAL COMBUSTION ENGINE INCLUDING MULTIPLE FUEL INJECTIONS EXTERNAL TO A PRE-CHAMBER

CROSS-REFERENCE TO RELATED APPLICATIONS

This application claims the benefit of U.S. Provisional Patent Application Ser. No. 63/027,371, filed on May 20, 2020, which is incorporated by reference herein.

BACKGROUND AND SUMMARY

The present application generally pertains to internal combustion engines and more particularly to an internal combustion engine including multiple fuel injections external to a pre-chamber.

It is known to experiment with internal combustion engines having a combustion pre-chamber, separate from a main combustion chamber or piston cylinder. See, for example, U.S. Pat. No. 10,161,296 entitled "Internal Combustion Engine" which issued to common inventor Schock et al. on Dec. 25, 2018; and PCT International Patent Publication No. WO 2019/027800 entitled "Diesel Engine with Turbulent Jet Ignition" which was commonly invented by Schock et al. Both of these are incorporated by reference herein. While these prior turbulent jet ignition configurations are significant improvements in the industry, additional improvements are desired to reduce parts and their associated expense, and to more concisely package the components, while achieving improved fuel efficiencies.

In accordance with the present invention, an internal combustion engine includes multiple fuel injections external to a pre-chamber. A further aspect provides an engine pre-chamber ignition apparatus which employs a pre-assembled and/or removable cartridge including an ignitor and a fresh air inlet but not a fuel inlet injector directly mounted thereto. In another aspect, an internal combustion engine apparatus includes at least one aperture extending between a pre-chamber and a main combustion chamber, with a tapered and enlarged internal surface being at an end of the aperture. A further aspect of a vehicular engine apparatus includes a fuel injector positioned externally to a pre-chamber which delivers an initial quantity of fuel for main chamber combustion and then a later and smaller quantity of fuel for pre-chamber ignition. Methods of manufacturing and using an internal combustion engine that employs multiple fuel injections external to a pre-chamber, are also provided.

The present engine apparatus is advantageous over conventional devices. For example, the external placement and use of a single fuel injector per pre-chamber and piston cylinder combination, reduces the expense and complexity of multiple fuel injectors, while obtaining improved packaging space in the pre-chamber cartridge. As another example, the present pre-chamber cartridge, without a fuel injector directly mounted thereto, allows for pre-assembly of components at a different location than where the cartridge is assembled to the engine cylinder head, and with reduced size, expense, internal passageways and assembly complexity. Furthermore, the present apparatus reduces engine weight and improves fuel mileage performance. Fastening of the present cartridge is also faster and easier to assemble and access while the present cartridge is more commercially practical to fit within various engine cylinder head configurations. Additional advantageous and features of the present system and method will become apparent from the following description and appended claims, taken in conjunction with the accompanying drawings.

DETAILED DESCRIPTION

Figures 1, 2:
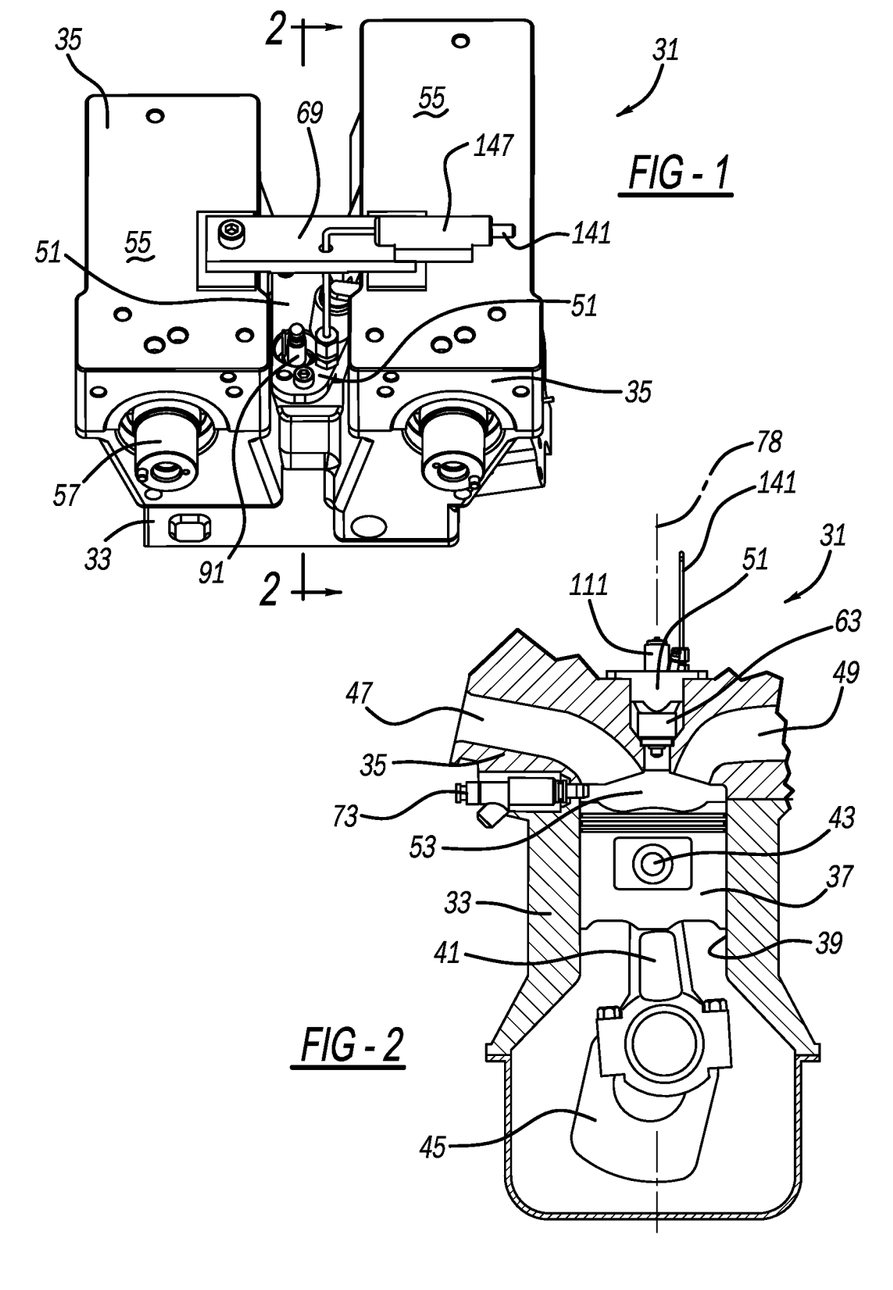
FIG. 1 is a top perspective view showing the present engine apparatus employing a pre-chamber cartridge fastened to an engine cylinder head.
FIG. 2 is a cross-section view, taken along line 2-2 of FIG. 1, showing the present apparatus.
Figure 3:
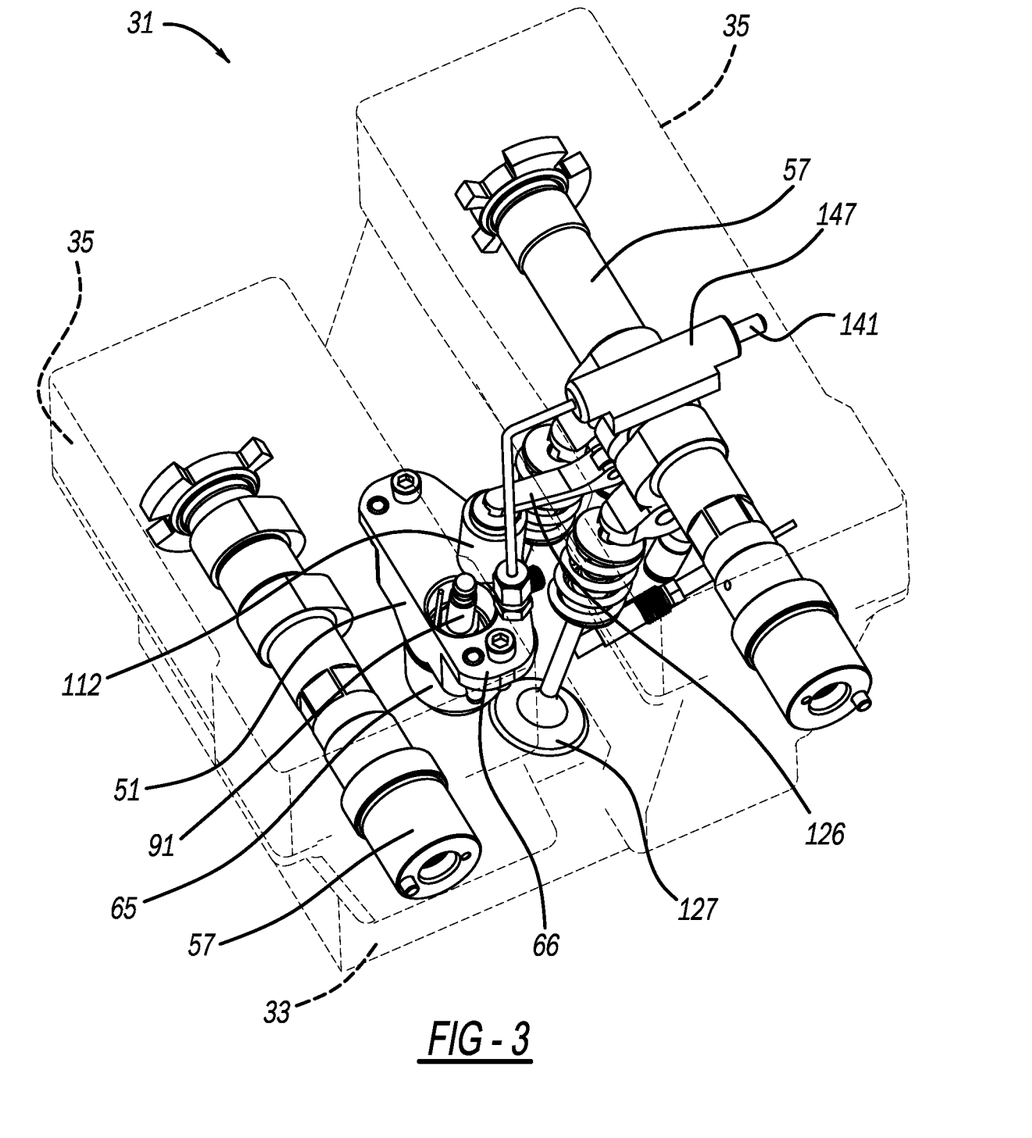
FIG. 3 is a top perspective view showing the pre-chamber cartridge and cam shafts of the present apparatus with the engine cylinder head removed.

Referring to FIGS. 1-3, an internal combustion engine 31 of an automotive vehicle includes an engine block 33 and a cylinder head 35 mounted thereto. A main driving piston 37 operably advances and retracts within a main piston cylinder cavity 39 in order to drive a connecting rod 41 spanning between a pin 43 of piston 37 and a crank shaft 45. Furthermore, cylinder head 35 includes an intake passage 47, an exhaust passage 49, and a pre-chamber cartridge 51 of a turbulent jet ignition system. A main combustion chamber 53 is located above main piston 37 partially within cylinder cavity 39 and cylinder head 35, directly below turbulent jet ignition cartridge 51. Cylinder head 35 optionally includes removable covers 55 and cam shafts 57 are rotatably located within the cylinder head. Although in some configurations, the cam shaft may be located with a cylinder block.

Figure 4:
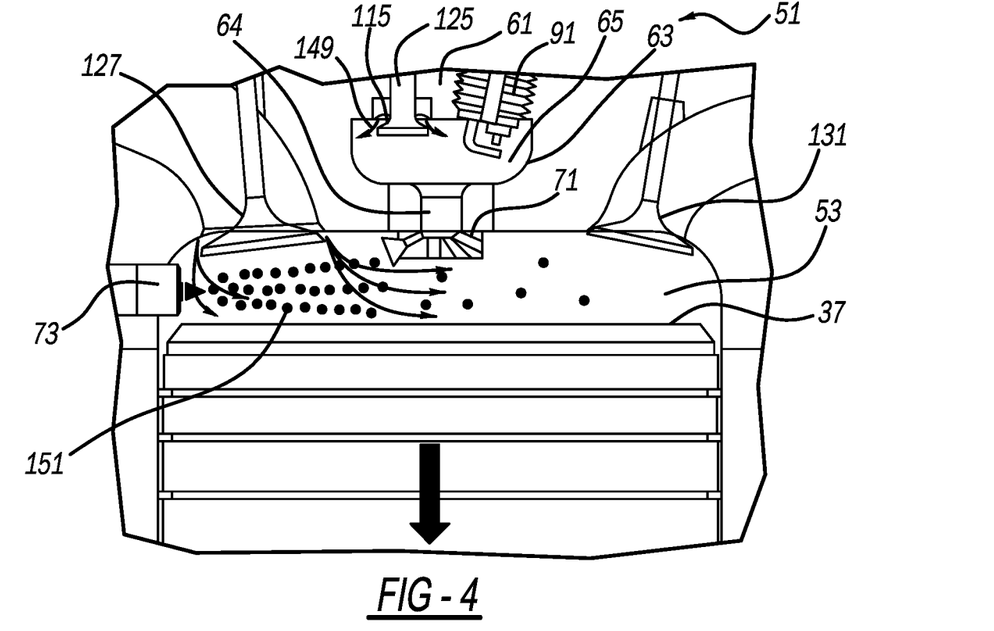
FIGS. 4-9 are a series of diagrammatic side views showing the pre-chamber cartridge and main piston cylinder of the present apparatus in different operating conditions.
Figure 10:
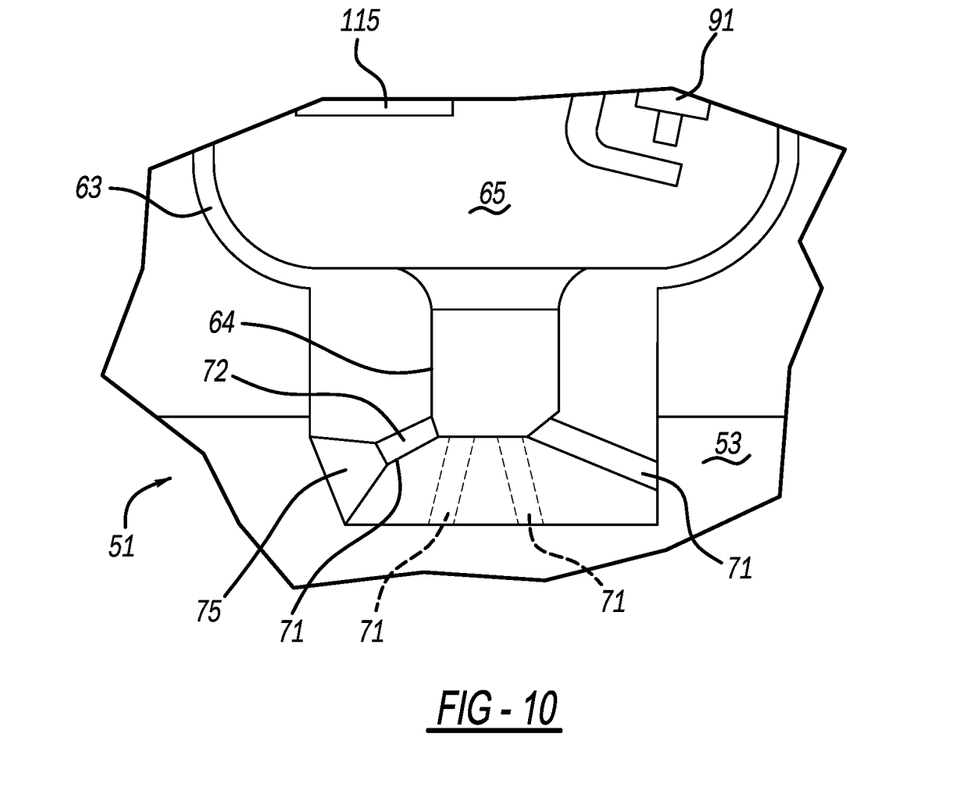
FIG. 10 is an enlarged diagrammatic side view showing an aperture port employed with the pre-chamber cartridge of the present apparatus.

Referring now to FIGS. 4 and 10, turbulent jet ignition cartridge 51 includes a body 61 and a cup-shaped and internally concave pre-chamber housing 63 which, in combination with a cylindrical nose 64 centrally and coaxially projecting therefrom, internally defines a pre-combustion cavity or chamber 65 therein. Cartridge 51 also has a laterally projecting flange 66 which is secured to top surfaces of cylinder head 35 via threaded fasteners, optional dowel pins, and a laterally elongated brace 69, or by other structures and fasteners.

At least one and more preferably three to ten elongated apertures 71 are always open and connect nose 64 of pre-chamber 65 to main combustion chamber 53. Each aperture has a constant diameter along a primary tubular section 72 thereof. However, at least aperture 71 closest to a fuel injector 73 has an enlarged and tapered port 75, preferably frusto-conical, at a distal end of primary section 72 interfacing with main piston cylinder 53. Preferably the distal ends of the other apertures 71 do not have the expanded port, although such a port may be optionally included for multiples of the aperture. In the example shown in FIG. 4, only diagonally oriented apertures 71 are provided, however, it is alternately envisioned that one or more centerline apertures may be included depending on the desired fuel and air mixing for a specific engine and fuel type.

Turbulent jet ignition cartridge 51 includes an ignitor 91 such as a spark plug, glow plug or the like. Ignitor 91 has a middle section removably secured within an elongated opening of body 61, and a distal end located within pre-chamber 65 for providing a spark or other heat ignition source for a fuel-rich, fuel-air mixture within the pre-chamber. An optional pre-chamber pressure transducer or indicator can be part of ignitor 91 or in communication through pre-chamber housing 63. It is also envisioned that an optional electrical resistance heater may be internally located within pre-chamber 65 or upstream of valve 125 in cartridge 51.

As can be observed in FIGS. 3-5 and 10, a pre-chamber air inlet valve 111 has a middle section located within another elongated opening through body 61 of cartridge 51, with an air valve seat 115 at a distal end thereof located within pre-chamber 65. Furthermore, a proximal end section of air inlet valve 111 is located within a generally cylindrical collar 112 integrally upstanding from body 61. Air inlet valve 111 includes a helically coiled spring and a securing cap retaining the spring to a longitudinally elongated shaft 125. Air inlet valve 111 is preferably a poppet valve type which is moved by a rocker arm 126 driven by cam shaft 57, or it may alternately be moved by a hydraulic electromagnetic or piezoelectric actuator.

Pre-chamber air inlet valve 111 is separate from a main piston chamber air intake valve 127 which is shown as a poppet configuration. Also, a cam-driven, poppet style exhaust valve 131 is located on an opposite upper portion of main piston chamber 53. Alternately, any of the poppet valves may instead be pintal or rotary valves.

A fresh air conduit 141 is externally connected to a top surface of cartridge 51 by way of a threaded fitting. One or more passageways inside the cartridge body transmits fresh air from conduit 141 to pre-chamber air valve 111. An inline heater 147 is positioned adjacent air conduit 141. Heater 147 can be a primarily external heater (as shown) or a primarily internal heater. In a version, it is envisioned that heater includes one or more electrically resistive wires or coils that are in contact with and heat aluminum metallic fins or structures projecting therefrom which contact conduit 141 and/or the fresh air flowing therethrough. For example, with the internal heater version, an open-cell metal foam, with highly interconnected porosity and circuitous paths, is inside the enlarged cylinder coaxially aligned with conduit 141, the foam structure being heated by the resistive coils. Such a heat transferring foam is disclosed in U.S. Patent Publication No. 2005/0092181 entitled "Active Filtration of Airborne Contaminants Employing Heated Porous Resistance-Heated Filters" to Shih et al., which is incorporated by reference herein. The present heater 147 and pre-chamber combination heats the incoming fresh air during initial engine start-up and initial warming; thereafter, the heater is deactivated. Alternately, a separate parallel bypass air conduit can feed directly to the body and air intake valve with an air flow valve switching between the two air conduits depending on whether heating is desired or not, as automatically controlled by a programmable pre-chamber or engine controller. Alternately, the heater may use resistance films within its body or air conduit rather than a wire or coil. The present heater and pre-chamber system is beneficially easier to install, easier to package, and more efficient and effective at heating fresh air prior to combustion than would be a heater associated only with the main piston cylinder.

Fuel injector 73 has an elongated and generally cylindrical tip preferably located in a laterally open bore in a side of main piston cylinder 53 adjacent primary air inlet valve 127. Alternately, fuel injector 73 can be located elsewhere in the piston cylinder external to the pre-chamber. The elongation and fuel injection direction of fuel injector 75 is generally perpendicular to a centerline axis 78 of pre-chamber 65, the centerline axis being coaxial with an advancing and retracting axis of piston 37. Alternately, the fuel injector direction may be within 80-110° offset from the centerline axis of pre-chamber 65. It is noteworthy that only a single fuel injector is employed for each piston cylinder 53 and pre-chamber 65 configuration and that no fuel injector is located within pre-chamber 65 for the present apparatus. Thus, if the engine is a four cylinder engine then there will be one fuel injector associated with each of the four piston cylinders with no fuel injectors directly located in or directly injecting into any of the four pre-chambers.

Cartridge 51 is preferably manufactured independently of cylinder head 35. An exterior of the cartridge is machined from aluminum or steel, with the passageways internally machined therein. Thereafter, the body of the cartridge is furnace brazed or diffusion welded if the body is cast or machined as two separate parts. Alternately, the cartridge body and/or pre-chamber may be made from a ceramic or other low thermal conductivity material. A tapered and annular seal, preferably made from copper, internally contacts the pre-chamber and seals between it and the threaded mating of the bottom end of the body, when they are screwed together. The ignitor and air valve are thereafter assembly to the body, such as by threaded screwing in of the components or as otherwise fastened.

Figure 5:
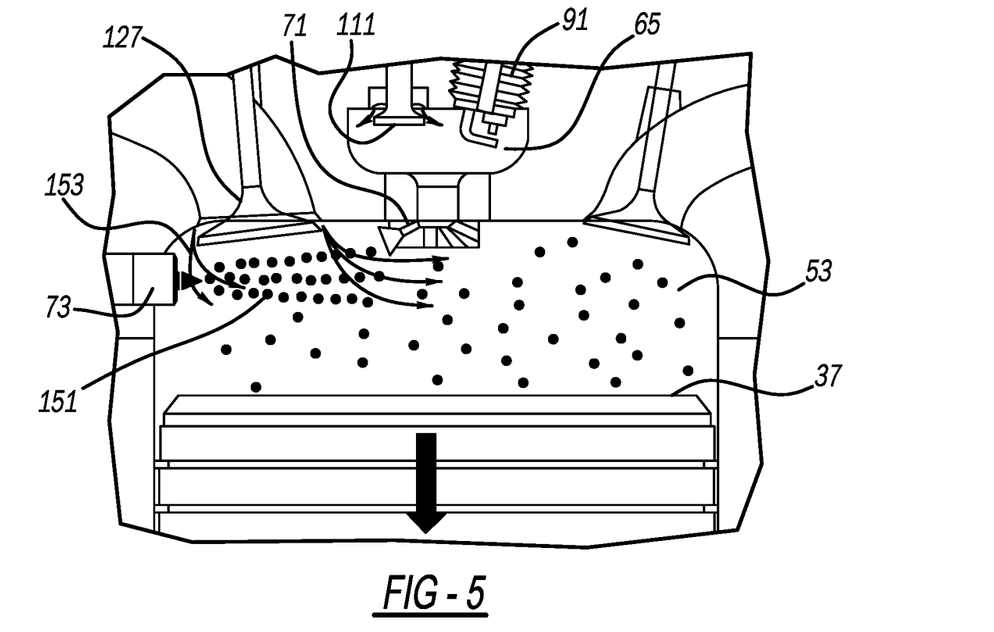

The function of the present apparatus will now be discussed with reference to FIGS. 4-9. Pre-chamber air inlet valve 111 advantageously serves a duel synergistic purpose: to supply air into the pre-chamber for combustion therein, and also to provide an additional air flow into the pre-chamber before and/or after the combustion therein in order to purge out combustion residuals. Thus, at the beginning of a cycle, where the associated crankshaft is in its rotary positions from 0-180° TDC, pre-chamber air valve seat 115 is open to allow fresh air 149 to push out and purge any residual combustion particles remaining in pre-chamber 65 from the previous cycle. This causes a greater air pressure in the pre-chamber than in main combustion chamber 53 as piston 37 is simultaneously advancing away from pre-chamber 65. Soon thereafter as can be seen in FIGS. 4 and 5, where the associated crankshaft is in its rotary positions from 60-200° TDC, fuel injector 73 emits a first spray of liquid fuel 151 in a direction generally perpendicular to or within 80-100° of pre-chamber and piston centerline axis 78 (see FIG. 2). Simultaneously, main air valve 127 is open to allow incoming air 153 to enter main combustion chamber 53 and assist in mixing the injected fuel 151 external to the pre-chamber. The air pressure within pre-chamber 65 is greater than the pressure within main combustion chamber 53 during this operational period, thereby essentially preventing the fuel from entering apertures 71.

Figure 6:
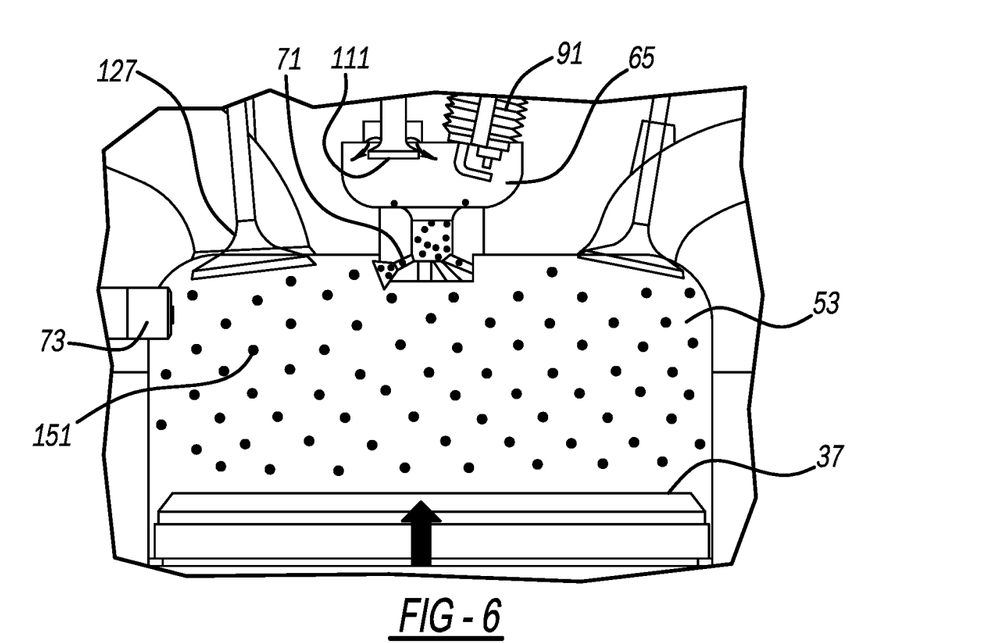
Figure 7:
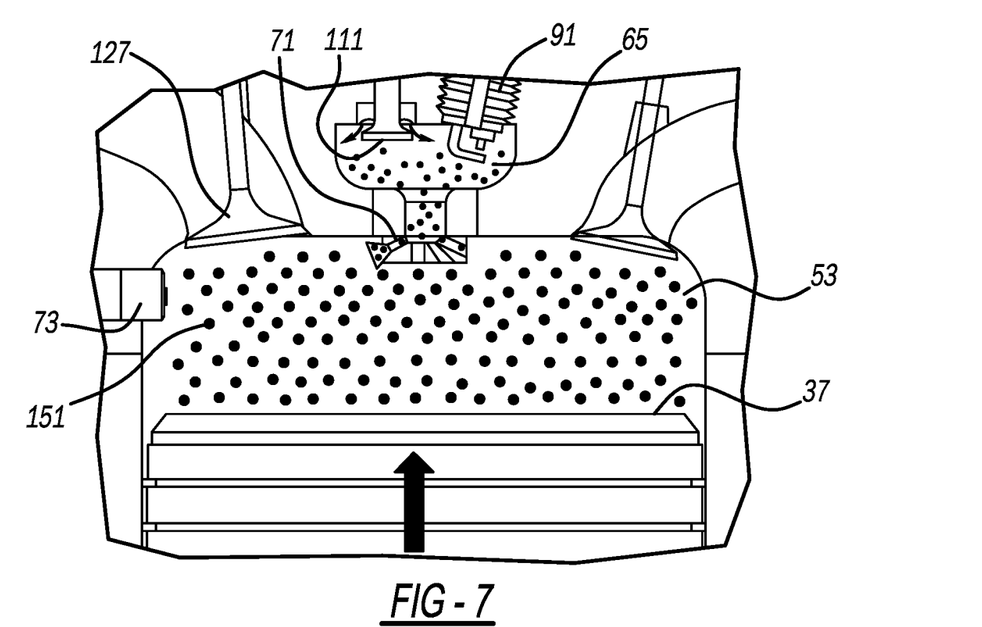

FIGS. 6 and 7 illustrate 200-235° TDC, where fuel injector 73 is deactivated and turned off, and piston 37 is in its retracting and compression motion toward pre-chamber 65. Main air valve 127 is closed in this operating positional range. This causes fuel 151 to enter pre-chamber 65 since the piston compression creates a greater pressure in main combustion chamber 53 than is present in the pre-chamber cavity even with fresh air entering the pre-chamber 65 from pre-chamber air valve 111. The air and fuel are turbulently swirling and mixing within the pre-chamber in this operating condition.

Figure 8:
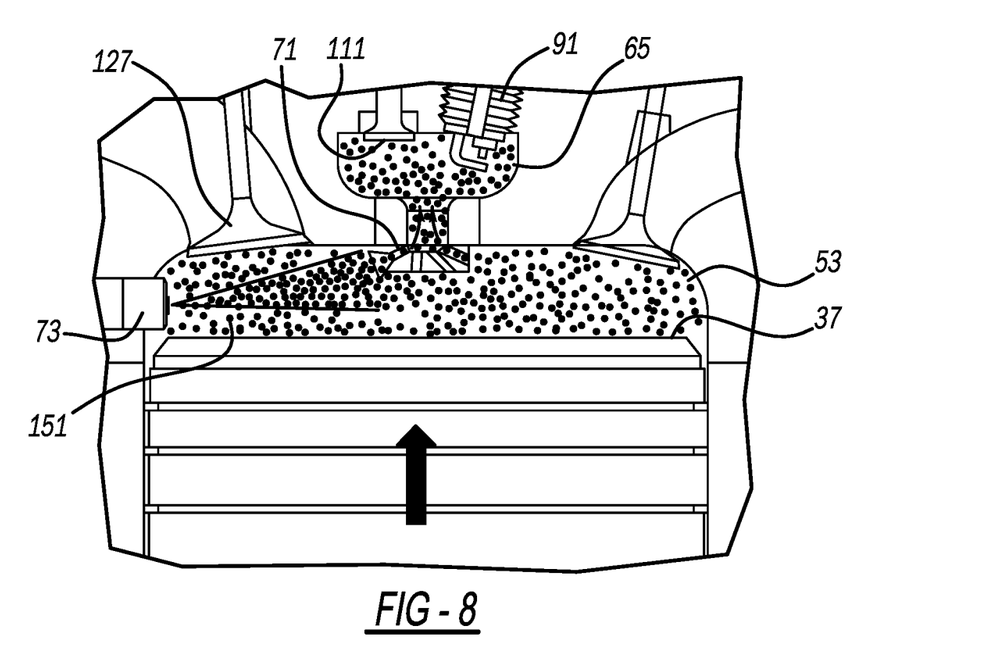

Next, FIG. 8 shows a 240-320° TDC positional range, with both air valves 111 and 127 closed and piston 37 continuing its compression retraction. Fuel injector 73 now emits a second mist or spray of liquid fuel 151 toward the longitudinal centerline between pre-chamber 65 and the combustion face of piston 37 in main combustion chamber 53. This FIG. 8 second amount of fuel is less than the first amount of fuel in FIGS. 4 and 5. This second emission of fuel causes a rich mixture of fuel and air to partially enter into the pre-chamber through apertures 71 and mixes with air and fuel already within main combustion chamber 53.

Figure 9:
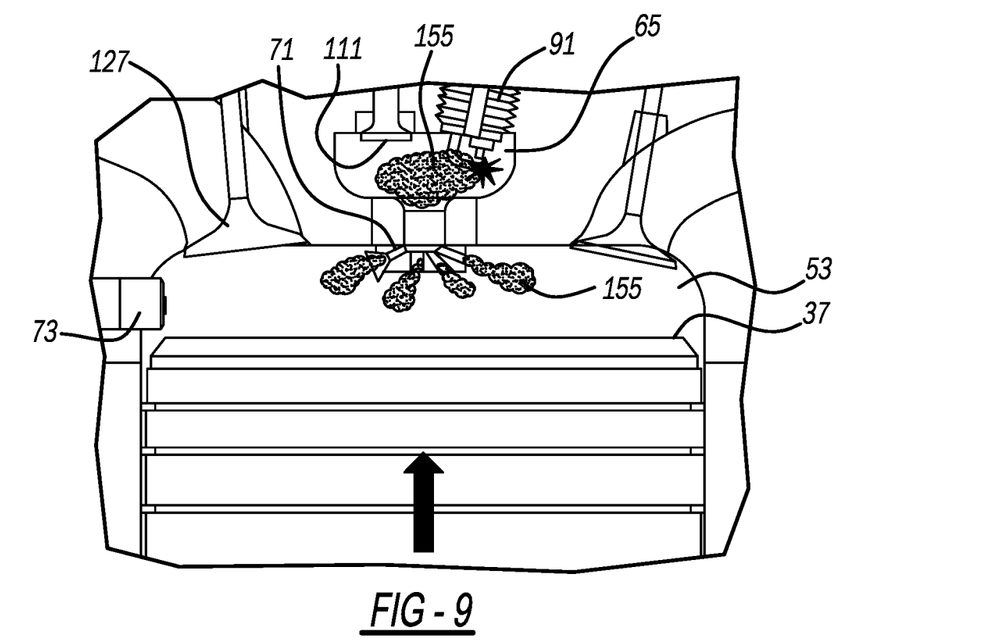

Subsequently, FIG. 9 is a 345-350° TDC position where the fuel injector is deactivated, the air valves are closed, and ignitor 91 is activated in pre-chamber 65. This causes an ignition and combustion of fuel 151 within pre-chamber 65. In turn, this pre-combustion 155 is externally emitted from pre-chamber to main combustion chamber 53 via apertures 71, which fully ignites fuel 151 located within the main piston cylinder. The main combustion occurring in main combustion chamber 53 serves to advance piston away from the pre-chamber.

Figure 11:
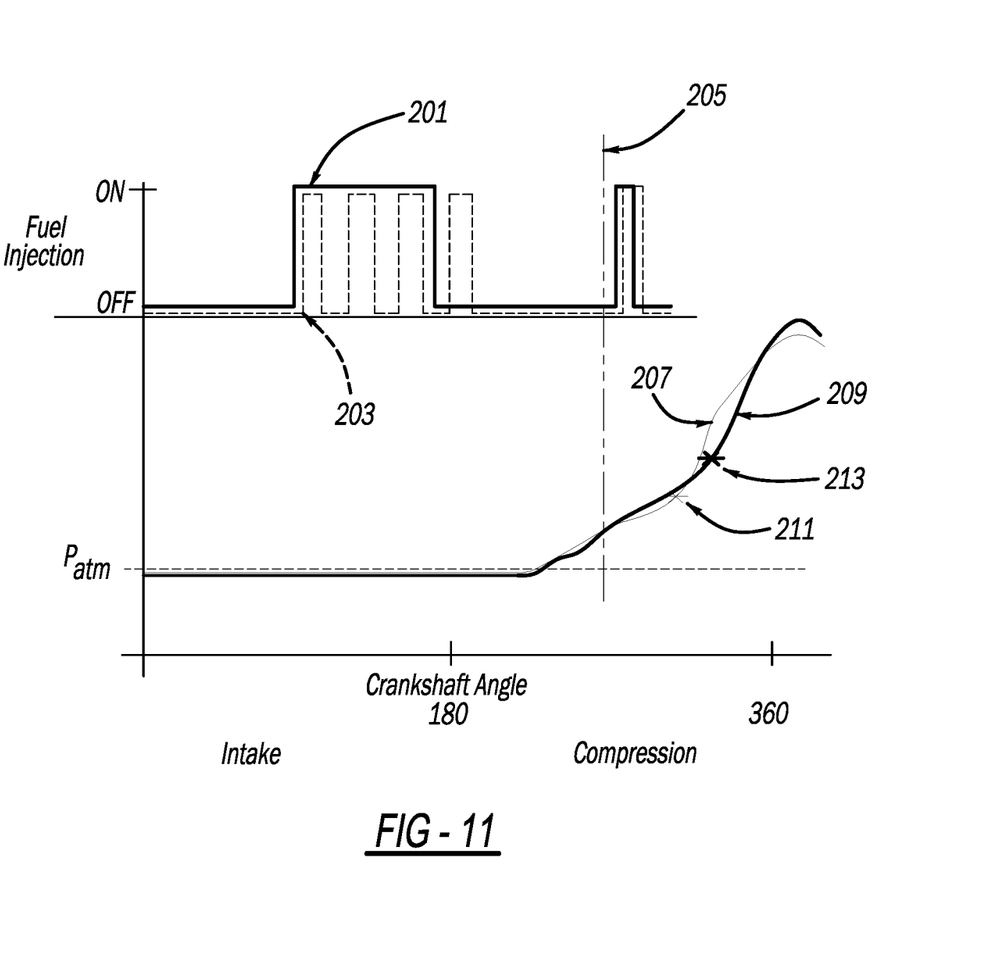
FIG. 11 is a graph showing fuel injection, ignition and combustion timing of the present apparatus.

FIG. 11 graphically illustrates the timing employed with two versions of the present apparatus. A first fuel injection version 201 (shown as solid lines in the top half) turns on the fuel injector for a continuous elongated period of time for the first emission. The fuel injection is then turned off. Then, the same fuel injector is turned back on for a second emission of fuel for a much shorter period of time after the pressure in the main combustion chamber exceeds the pressure in the pre-chamber at time 205. The pre-chamber pressure is indicated by line 207 and main combustion chamber pressure is indicated by line 209 in the lower portion of the graph; $P_{atm}$ is atmospheric pressure. Thereafter, ignition occurs in the pre-chamber at point 211 and main piston combustion, caused by the pre-combustion particles flowing from the pre-chamber to the main chamber via the apertures, occurs soon thereafter at point 213.

The second variation is shown in dashed lines as 203. In this configuration, the initial first fuel emission is actually a series of multiple and rapid initial on and off fuel emissions occurring while the pressure within the pre-chamber exceeds the main combustion chamber pressure. This approach allows each of the first series of fuel emissions and the later single fuel emission after point 205, to be of generally equal quantities, but in overall collectively providing a significantly greater total quantity and timing before as compared to after point 205.

The present apparatus and method can be used for either gasoline, gaseous or heavy diesel fuel. Nevertheless, diesel fuel is expected to be ideally suited for this external fuel injection back into the pre-chamber since a mist of the diesel fuel is finer and has a smaller droplet size as compared to gasoline. Therefore, the finer diesel mist will be more completely pushed back from the main piston cylinder into the pre-chamber and more thoroughly mixed in the pre-chamber with the fresh air from the pre-chamber air valve.

While various feature of the present invention have been disclosed, it should be appreciated that other variations may be employed. For example, different air valve actuator configurations and positions can be employed, although various advantages of the present system may not be realized. As another example, the cartridge may have a different shape than that illustrated, but certain benefits may not be obtained. Additionally, alternate shapes, quantities and angles of the passageways, conduits, openings, ports and apertures may be provided in the cartridge, although some advantages may not be achieved. Alternately, variations in the fuel-air mixture, and fuel injection timing can be used, but performance may suffer. For example, various alternate liquid or gaseous fuels may be used in place of gasoline. Moreover, while the presently illustrated cartridge and pre-chamber construction are best suited for an overhead cam engine, differently shaped and sized cartridges and pre-chambers may be employed for differently configured engines such as for a cam-in-block engine. Variations are not to be regarded as a departure from the present disclosure, and all such modifications are intended to be included within the scope and spirit of the present invention.

The invention claimed is:

1. An engine apparatus comprising:
   (a) a pre-chamber including a pre-combustion cavity and at least one combustion exit aperture;
   (b) an ignitor having a distal end in or directly accessible to the pre-combustion cavity;
   (c) a pre-chamber air inlet valve having a portion located in or adjacent to the pre-combustion cavity;
   (d) a main piston cylinder including a main combustion chamber;
   (e) a fuel injector located external to the pre-combustion cavity, the fuel injector including an injection tip located in the main combustion chamber, a centerline axis of the fuel injector being between an uppermost surface of the main piston cylinder and the ignitor such that the centerline axis of the fuel injector does not intersect the uppermost surface of the main piston cylinder in any operating position of the main piston cylinder, and the fuel injector being spaced away from the pre-chamber;
   (f) the fuel injector being configured to emit a first amount of fuel into the main combustion chamber which is pushed into the at least one aperture for subsequent pre-combustion by the ignitor within the pre-chamber cavity, the fuel injector being the sole source of the fuel into the pre-chamber cavity; and
   (g) the same fuel injector being configured to emit at least a second amount of the fuel into the main combustion chamber which is less than the first amount of the fuel for combustion in the main combustion chamber and at least the second amount of the fuel being ignited by the pre-combustion occurring in the pre-chamber cavity.

2. An engine apparatus comprising:
   (a) a pre-chamber including a pre-combustion cavity and at least one combustion exit aperture;
   (b) an ignitor having a distal end in or directly accessible to the pre-combustion cavity;
   (c) a pre-chamber air inlet valve having a portion located in or adjacent to the pre-combustion cavity;
   (d) a main piston cylinder including a main combustion chamber;
   (e) a fuel injector located external to the pre-combustion cavity, the fuel injector including an injection tip located in the main combustion chamber, and the fuel injector being spaced away from the pre-chamber; and
   (f) the fuel injector operably emitting fuel into the main combustion chamber which is pushed into the at least one aperture for subsequent pre-combustion by the ignitor within the pre-chamber cavity, the fuel injector being the sole source of the fuel into the pre-chamber cavity;
   (g) wherein the pre-chamber is part of a cartridge, the ignitor, the pre-chamber air inlet valve and the pre-chamber cavity are preassembled to a body of the cartridge, and the preassembled cartridge is subsequently removably mounted to an engine cylinder head.

3. The apparatus of claim 2, wherein the cartridge does not have a fuel injector mounted thereto and the fuel is not directly injected into the pre-chamber cavity except indirectly through the at least one aperture.

4. The apparatus of claim 1, wherein the at least one aperture comprises an elongated section with a uniformly circular inner diameter and an enlarged port at an end of the aperture, the port has an expanded inner dimension greater than the elongated section.

5. The apparatus of claim 4, wherein an inner surface of the port is frusto-conical and expanded toward the main combustion chamber.

6. The apparatus of claim 4, wherein only one of multiple apertures extending from the pre-chamber to the main combustion chamber has the enlarged port, and the aperture with the port is located closest to the fuel injector.

7. The apparatus of claim 1, wherein the second amount of fuel is 3-15% of the first amount of fuel, the first amount of fuel is injected before a change-over point when pressure within the main combustion chamber changes from being less than to exceeding pressure within the pre-chamber, and the second amount of fuel is injected after the change-over point.

8. The apparatus of claim 1, wherein the pre-chamber air inlet valve emits fresh air into the pre-chamber cavity after the combustion part of a cycle therein to purge combustion particles in the pre-chamber cavity, during each cycle, and the centerline axis of the fuel injector points at at least one of the combustion exit apertures of the pre-chamber.

9. The apparatus of claim 1, wherein:
the first amount of the fuel is emitted for a greater period of time than for the second amount of the fuel; and
a fuel and air mixture within the pre-chamber is fuel-rich prior to ignition.

10. The apparatus of claim 1, further comprising:
a piston linearly advancing and retracting along a longitudinal axis within the main piston cylinder;
the pre-chamber comprises a concave-curved cup and a cylindrical nose centrally extending therefrom toward the piston and being coaxial with the longitudinal axis of the piston;
a greatest lateral inside diameter of the pre-chamber cup being greater than an inside diameter of the nose; and
the at least one aperture including at least four of the apertures extending through the nose.

11. An engine apparatus comprising:
(a) a preassembled cartridge comprising:
 i. a body including openings therein;
 ii. a pre-chamber coupled to the body, the pre-chamber including a pre-combustion cavity and at least one combustion exit aperture;
 iii. an ignitor located in a first of the body openings;
 iv. an air inlet valve located in a third of the body openings;
(b) a piston cylinder;
(c) a piston linearly advancing and retracting along a longitudinal axis within the main piston cylinder;
(d) a single fuel injector associated with the main piston cylinder and the pre-chamber, located external to the pre-combustion cavity, the fuel injector including an injection tip located in the main piston cylinder;
(e) a main air intake valve associated with an air inlet in the main piston cylinder external to the pre-chamber; and
(f) the pre-chamber comprising a concave-curved cup being coaxial with the longitudinal axis of the piston.

12. The apparatus of claim 11, wherein the pre-chamber is part of the cartridge, the ignitor, the pre-chamber air inlet valve and the pre-chamber cavity are preassembled to a body of the cartridge, and the preassembled cartridge is subsequently removably mounted to an engine cylinder head.

13. The apparatus of claim 12, wherein the cartridge does not have a fuel injector mounted thereto, the fuel is not directly injected into the pre-chamber cavity except indirectly through the at least one aperture, and a centerline axis of the fuel injector is between an uppermost surface of the piston cylinder and the ignitor such that the centerline axis of the fuel injector does not intersect the uppermost surface of the piston cylinder in any operating position of the piston cylinder.

14. The apparatus of claim 11, wherein:
(a) the fuel injector operably emits a first amount of liquid fuel into the main piston cylinder which is homogeneously mixed in a main combustion cavity and during later stages of compression, some of the first amount of liquid fuel being compressed into the pre-chamber cavity;
(b) the same fuel injector operably emits a later amount of the liquid fuel into the main piston cylinder which is less than the first amount of the liquid fuel for combustion to enrichen a fuel-air mixture in the pre-chamber cavity; and
(c) the later amount of the liquid fuel is ignited by the pre-combustion occurring in the pre-chamber cavity.

15. The apparatus of claim 14, wherein the later amount of fuel is 3-15% of the first amount of fuel injected before that time.

16. The apparatus of claim 11, wherein the at least one aperture comprises an elongated section with a uniformly circular inner diameter and an enlarged port at an end of the aperture, the port has an expanded inner dimension greater than the elongated section.

17. The apparatus of claim 11, wherein:
(a) the pre-chamber air inlet valve emits fresh air into the pre-chamber cavity after an exhaust stroke therein to purge combustion particles in the pre-chamber cavity, during each cycle; and
(b) a second amount of fuel is 3-15% of a first amount of fuel, the first amount of fuel is injected from the fuel injector before a change-over point when pressure within a main combustion cavity changes from being less than to exceeding pressure within the pre-chamber cavity, and the second amount of fuel is injected after the change-over point.

18. The apparatus of claim 11, further comprising:
an engine cylinder head;
camshafts;
the cartridge being removably mounted in a valley of the engine cylinder head between the camshafts which are rotatable about parallel axes, the axes being substantially perpendicular to the longitudinal centerline of the pre-chamber;
an emission of a first amount of the fuel by the fuel injector for use in the main chamber is of a greater period of time than for an emission of a last amount of the fuel by the fuel injector for use to enrichen the pre-chamber; and
a fuel and air mixture within the pre-chamber is fuel-rich.

19. An engine apparatus comprising:
(a) a pre-chamber including a pre-combustion cavity and multiple combustion exit apertures;
(b) an ignitor having a distal end in the pre-combustion cavity;

(c) a pre-chamber air inlet valve having a portion located in a passageway directly entering the pre-combustion cavity;
(d) a main piston cylinder including a main combustion chamber;
(e) a single fuel injector located external to the pre-combustion cavity, the single fuel injector including an injection tip located in the main combustion chamber, and the single fuel injector being spaced away from the pre-chamber;
(f) the single fuel injector being configured to emit a first amount of fuel into the main combustion chamber which is pushed into at least one of the apertures for subsequent pre-combustion by the ignitor within the pre-chamber cavity;
(g) the single fuel injector being configured to subsequently emit at least a second amount of the fuel into the main combustion chamber, the second amount of fuel being 3-15% of the first amount of fuel;
(h) the pre-chamber being part of a cartridge with the ignitor, the pre-chamber air inlet valve and the pre-chamber cavity being preassembled to the cartridge, and the preassembled cartridge being configured for removable mounting to an engine cylinder head; and
(i) the cartridge not having a fuel injector mounted thereto and the fuel not being directly injected into the pre-chamber cavity except indirectly through at least one of the apertures.

20. The apparatus of claim 19, further comprising a fresh air conduit externally connected to a top surface of the cartridge, and a heater positioned adjacent the air conduit.

21. The apparatus of claim 19, wherein:
the air valve is open to allow incoming fresh air to enter the main combustion chamber and to assist in mixing injected fuel external to the pre-chamber, while air pressure within the pre-chamber is greater than an air pressure within the main combustion chamber to substantially prevent the fuel from entering the apertures; and
when the fuel injector is deactivated and the piston is in a compression motion toward the pre-chamber, the air valve is closed and the fuel enters the pre-chamber from the main combustion chamber while fresh air enters the pre-chamber.

22. An engine apparatus comprising:
(a) a pre-chamber including a pre-combustion cavity and multiple combustion exit apertures, at least a first of the exit apertures having a different main combustion chamber-facing port diameter as compared to another of the exit apertures;
(b) an ignitor having a distal end in or directly accessible to the pre-combustion cavity;
(c) a pre-chamber air inlet valve having a portion located in or adjacent to the pre-combustion cavity;
(d) a main piston cylinder including a main combustion chamber;
(e) a fuel injector located external to the pre-combustion cavity, the fuel injector including an injection tip located in the main combustion chamber, and the fuel injector being spaced away from the pre-chamber;
(f) the fuel injector operably emitting a first amount of fuel into the main combustion chamber which is pushed into the at least one aperture for subsequent pre-combustion by the ignitor within the pre-chamber cavity, the fuel injector being the sole source of the fuel into the pre-chamber cavity;
(g) the same fuel injector operably emitting at least a second amount of the fuel into the main combustion chamber which is less than the first amount of the fuel for combustion in the main combustion chamber and at least the second amount of the fuel being ignited by the pre-combustion occurring in the pre-chamber cavity;
(h) the pre-chamber comprising a concave-curved cup being coaxial with the longitudinal axis of the piston; and
(i) a fresh air conduit externally connected to a top surface of a cartridge which includes the prechamber and the ignitor, and a heater positioned adjacent the air conduit.

23. The apparatus of claim 22, wherein the port of the first of the exit apertures is of a larger diameter than the other of the exit apertures, the first of the exit apertures is angled toward the fuel injector, there is a taper in the first of the exit apertures between the port and the pre-chamber-facing end thereof, and a centerline axis of the fuel injector is between an uppermost surface of the main piston cylinder and the ignitor such that the centerline axis of the fuel injector does not intersect the uppermost surface of the main piston cylinder in any operating position of the main piston cylinder.

24. The apparatus of claim 22, wherein the second amount of fuel being 3-15% of the first amount of fuel, and the fuel including liquid gasoline or heavy fuel.

25. The apparatus of claim 1, further comprising a fresh air conduit externally connected to a top surface of a cartridge which includes the prechamber and the ignitor, and a heater positioned adjacent the air conduit.

26. The apparatus of claim 19, further comprising:
a main air valve being open to allow incoming fresh air to enter the main combustion chamber and to assist in mixing injected fuel external to the pre-chamber, while air pressure within the pre-chamber is greater than air pressure within the main combustion chamber to substantially prevent the fuel from entering the apertures; and
when the fuel injector is deactivated and the piston is compression motion toward the pre-chamber, the main air valve is closed and the fuel enters the pre-chamber from the main combustion chamber while fresh air enters the pre-chamber.

27. The apparatus of claim 1, wherein the fuel is heavy fuel.

* * * * *